UNITED STATES PATENT OFFICE.

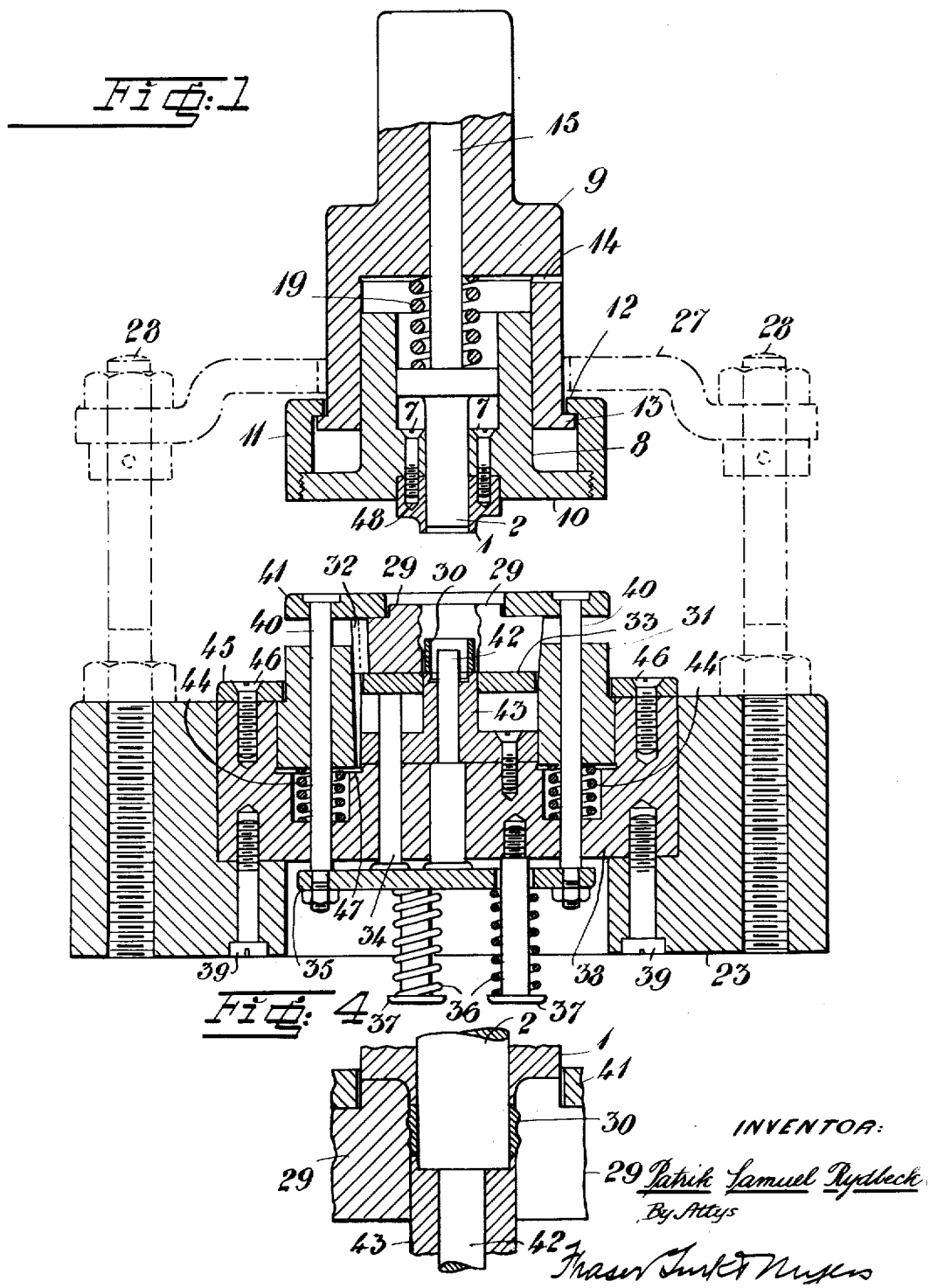

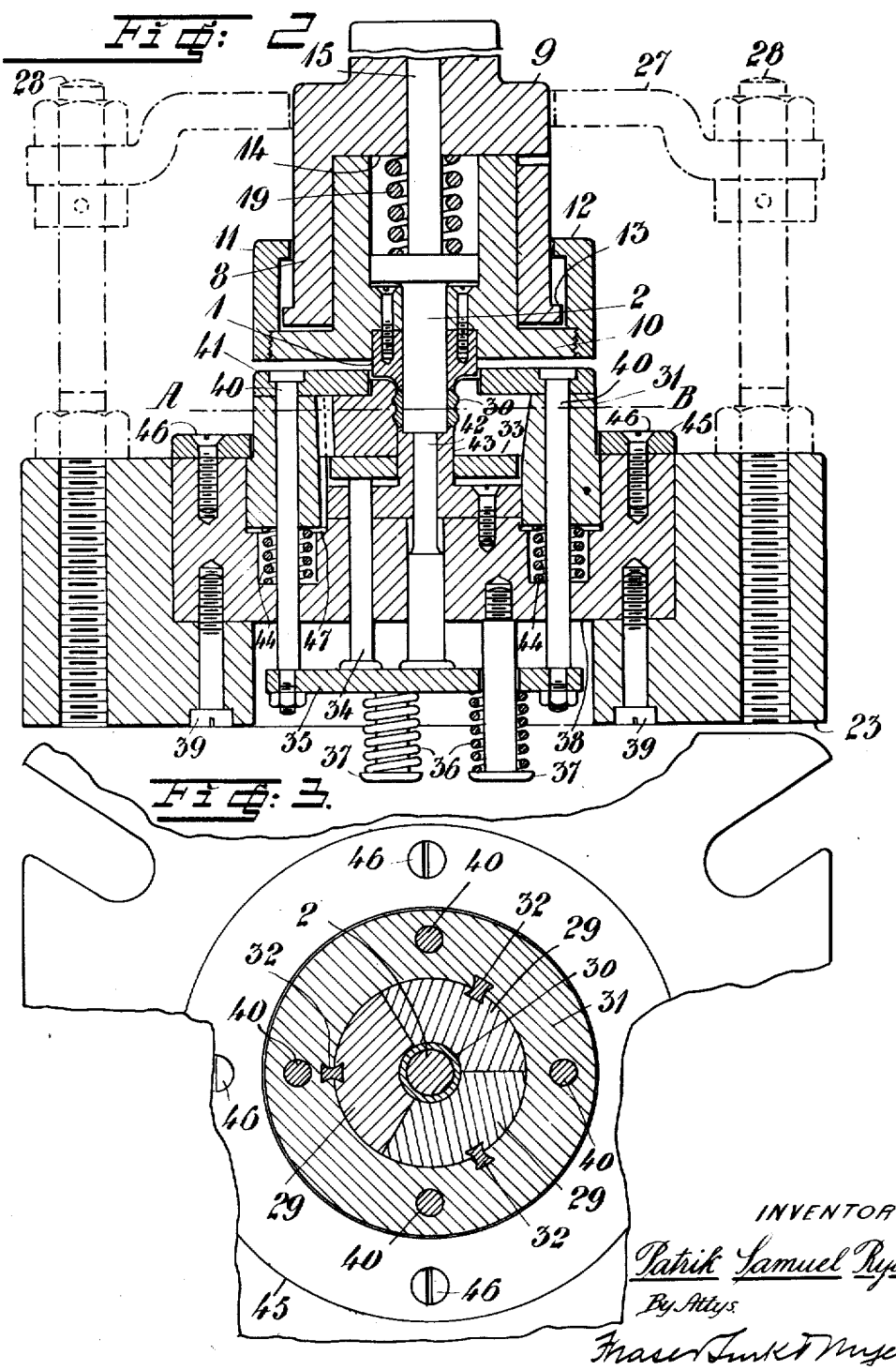

PATRIK SAMUEL RYDBECK, OF GOTTENBORG, SWEDEN.

APPARATUS FOR MANUFACTURING RINGS, ESPECIALLY TRACK-RINGS FOR BALL AND ROLLER BEARINGS.

1,338,462.     Specification of Letters Patent.     Patented Apr. 27, 1920.

Original application filed July 9, 1918, Serial No. 244,060. Divided and this application filed October 23, 1919. Serial No. 332,794.

*To all whom it may concern:*

Be it known that I, PATRIK SAMUEL RYDBECK, a subject of the King of Sweden, residing at Gottenborg, in the Kingdom of Sweden, have invented new and useful Apparatus for Manufacturing Rings, Especially Track-Rings for Ball and Roller Bearings, of which the following is a specification.

This invention, being a division of my pending application, Serial No. 244,060, filed July 9, 1918, relates to means for manufacturing rings, especially the inner track-rings for ball and roller bearings.

The primary object of the invention is to provide an improved pressing apparatus by means of which such rings may be manufactured with exact dimensions simpler and cheaper than heretofore.

The invention consists, chiefly, in the combination with a pressing apparatus, of a die composed of a number of separate jaws movable in relation to each other and, when joined, having inside the shape of the outer side of the ready pressed ring, a counter die adapted to support one end of a tubular blank, an upsetting ring movable longitudinally in relation to the die and adapted to press against the other end of the blank, and a mandrel movable longitudinally in the upsetting ring and having the shape of the inner side of the ready pressed ring.

An embodiment of my invention is illustrated in the accompanying drawings in which:—

Figure 1 is a vertical section of an upsetting device constructed according to this invention. Fig. 2 is a view corresponding to Fig. 1 and showing the pressing tools in a middle position. Fig. 3 is a cross-section on line A—B in Fig. 2. Fig. 4 is a sectional view, on a greater scale, of the pressing tools.

Referring to the drawings, which show a device adapted for pressing the inner track-rings of ball-bearings, 29 is a die composed of three separate jaws movable radially in relation to each other and forming, when joined, an inner cylindrical surface having two annular recesses situated at each side of an annular rib of curved cross-section, said recesses and rib corresponding to the two shoulders and the ball-track respectively of the finished track-ring 30, as will appear from Fig. 4. The jaws 29 having a conical outer surface are movable in a conical recess formed in a die 31, and each of them is guided by a wedge 32. They rest on an annular plate 33 movable in the die 31 and supported by four uprights 34 (one only of which is shown) secured to a plate 35. Said plate 35 bears against spiral springs 36 supported by three screw-bolts 37 (two only of which are shown) screwed in the die-holder 38. Said die-holder is by means of screws 39 rigidly secured to the support 23. Attached to the plate 35 are four screw-bolts 40 passing through holes in the die-holder 38 and the die 31 and at the top rigidly connected with a ring 41 bearing against the upper end of the jaws 29. Consequently, at the downward movement of the plate 35 also the jaws 29 are moved downward and at the same time toward each other, owing to the conical seat in the die 31. The downward movement of the plate 35 is effected by means of an upright 42 secured to the same and extending through a central hole in the die-holder 38 and the counter-die 43 which in this case is rigidly connected with said die-holder, the upright 42 being actuated by the mandrel 2 placed in the holder 9. As shown in Fig 1, the top of the upright 42 extends normally above the counter-die 43 which is provided at the upper part with a cylindrical recess having the same diameter as the mandrel 2. The die 31 is movable in the die-holder 38 and bears normally, owing to the action of springs 44, against the lower edge of a ring 45 attached by means of screws 46 to the die-holder 38. The downward movement of the die 31 which is counteracted by the springs 44 is limited by the annular bottom surface 47 of the die-holder 38.

The upsetting ring 1 is, by means of screws 7, fastened to a socket 8 movable in the longitudinal direction in a holder 9 connected with the movable members of the pressing machine. At the lower end the socket 8 is provided with an annular flange 10 onto which is screwed an outer socket 11 provided at the top with an inwardly directed flange 12. In the position shown in Fig. 1 the flange 12 bears against a flange 13 disposed at the lower end of the holder 9 thus preventing the socket 8 and the upsetting ring 1 from falling down. The upward movement of the socket 8 is limited by the bottom 14 of the holder 9. Placed inside the socket 8 and movable longitudinally in relation to the same is the mandrel 2, the turned off portion 15 of which is guided in a central hole in the holder 9. Placed between the mandrel 2 and the bottom 14 of the holder 9 in a strong spring 19 counteracting the upward movement of the mandrel 2 and the travel of which is equal to or greater than the upsetting of the ring 30. The mandrel 2, which fits snugly in the upsetting ring 1, has a diameter corresponding to the inner diameter of the finished ring 30, and the outer diameter of the lower portion of the upsetting ring 1 is equal to the outer diameter of the ring 30.

Further a stripper 27 is disposed consisting of an annular member inclosing the holder 9 and provided with two radial arms rigidly secured by means of screw-bolts 28 to the support 23.

The operation of the device is as follows. The tubular blank 30 is placed on the stationary counter-die 43, which is possible without difficulty, because the jaws 29 are moved apart, as will appear from Fig. 1. Then the holder 9 together with the upsetting ring 1 and the mandrel 2 is moved downward. Owing thereto, the lower surface 48 of the upsetting ring 1 comes in contact with the jaws 29, and since the pressure exerted at that moment by the upsetting ring corresponds only to the weights of the sockets 8 and 11 the upsetting ring is stopped a moment in this position, while the holder 9 and the mandrel 2 continue to move downward. The mandrel 2 is moved into the blank 30 at the same time moving the upright 42 and the plate 35 downward against the action of the springs 36, the total tension of which is less than that of the spring 19. By the aid of the bolts 40 and the ring 41 the jaws 29 are also moved downward and toward each other, so that, when the mandrel 2 has been brought in contact with the stationary counter-die 43, the jaws are completely moved together and press the blank 30 against the mandrel 2. At the same time the ring 41 comes in contact with the upper surface of the die 31, as shown in Fig. 2. Meanwhile the upsetting ring 1 has followed the jaws 29 in their downward movement, until it comes in contact with the upper edge of the blank 30 and then is stopped a moment. Owing to the dies in this moment being not completely moved downward, an interspace exists between the surface 48 of the upsetting ring and the jaws 29 corresponding to about half the total upsetting of the finished ring. In this moment the socket 8 is brought in contact with the bottom 14 of the holder 9, and the upsetting of the blank commences (Fig. 2). Because the upsetting movement takes place at the upsetting ring 1, while the counter-die is stationary, the upper shoulder of the track-ring will be upset in the first line, while the lower shoulder will be upset only in part. When this phase of the upsetting operation is ended, the lower surface 48 of the upsetting ring is again brought in contact with the jaws 29, and on account thereof the movement of the upsetting ring ceases in relation to the jaws and the ring 30. The holder 9 and the upsetting ring 1 continue, however, to move downward, which results in that the jaws 29 together with the die 31 are pressed downward against the action of the springs 44, until the die 31 comes in contact with the annular bottom surface 47 of the die-holder 38. Said movement of the jaws 29 and the die 31 will cause the counter-die 43 to be, so to say, moved upward against the lower edge of the ring 30 or, in other words, the upsetting operation is now effected by the counter-die 4, and, therefore, also the lower shoulder of the track-ring will be completely upset, the ring thus obtaining the cross-section form shown in Fig. 4.

The upsetting of the ring 30 is now completed, and the holder together with the upsetting ring 1 commences to move upward. Owing thereto, the pressure on the jaws 29 and the upright 42 ceases, and the die 31 with the jaws 29 is moved upward by the springs 44. At the same time the jaws, by the aid of the plate 35, and the uprights 34 together with the plate 33, by the aid of the springs 36, are moved upward in relation to the die 31 to the separated position shown in Fig. 1. The finished ring 30 still adheres to the mandrel 2. At the continued upward motion of the holder 9 the socket 11 strikes the stripper 27, and on account thereof the socket 8 and the up-setting ring 1 are moved downward to the position shown in Fig. 1; the ring 30 thus being stripped off from the mandrel 2 may be removed in any suitable manner.

Having now particularly described and ascertained the nature of my said invention and in what manner the same is to be performed, I declare that what I claim is:—

1. Apparatus for producing rings, as for instance track-rings for ball and roller bearings, comprising a die composed of a number of separate jaws movable in relation to each other and, when joined, having inside the shape of the outer side of the ready pressed ring, a counter-die adapted to support one end of a tubular blank, an upsetting ring movable longitudinally in relation to the die and adapted to press against the other end of the blank, and a mandrel movable longitudinally in the upsetting ring and having the shape of the inner side of the ready pressed ring.

2. Apparatus for producing rings, as for instance track-rings for ball and roller bearings, comprising a die composed of a number of separate jaws movable in relation to each other and, when joined, having inside the shape of the outer side of the ready pressed ring and outside conical form, a die having a seat corresponding to said conical form, a counter-die adapted to support one end of a tubular blank, an upsetting ring movable longitudinally in relation to the said jaws and adapted to press against the other end of the blank, and a mandrel movable longitudinally in the upsetting ring and having the shape of the inner side of the ready pressed ring.

3. Apparatus for producing rings, as for instance track-rings for ball and roller bearings, comprising a die composed of a number of separate jaws movable in relation to each other and, when joined, having inside the shape of the outer side of the ready pressed ring and outside conical form, a die having a seat corresponding to said conical form, a counter-die adapted to support one end of a tubular blank, an upsetting ring movable longitudinally in relation to the said jaws and adapted to press against the other end of the blank, a yielding support for the said jaws, means connecting said support with said jaws, and a mandrel movable longitudinally in the upsetting ring and having the shape of the inner side of the ready pressed ring.

4. Apparatus for producing rings, as for instance track-rings for ball and roller bearings, comprising a die composed of a number of separate jaws movable in relation to each other and, when joined, having inside the shape of the outer side of the ready pressed ring and outside conical form, a die having a seat corresponding to said conical form, a counter-die adapted to support one end of a tubular blank, an upsetting ring movable longitudinally in relation to the said jaws and adapted to press against the other end of the blank, a yielding support for said jaws, a die-holder supporting the seat forming die, a counter-die rigidly connected with said die-holder, and a mandrel movable longitudinally in the upsetting ring and having the shape of the inner side of the ready pressed ring.

In testimony whereof I have signed my name.

PATRIK SAMUEL RYDBECK.

It is hereby certified that Letters Patent No. 1,338,462, granted April 27, 1920, upon the application of Patrik Samuel Rydbeck, of Gottenborg, Sweden, for an improvement in "Apparatus for Manufacturing Rings, Especially Track-Rings for Ball and Roller Bearings," were erroneously issued to the inventor, said Rydbeck, whereas said Letters Patent should have been issued to *Aktiebolaget Svenska Kullagerfabriken, of Göteborg, Sweden, a Corporation of Sweden*, as assignee of the *entire interest* in said invention, as shown by the records of assignments in this office; and that the said Letters Patent should be read with this correction therein that the same may conform to the record of the case in the Patent Office.

Signed and sealed this 25th day of May, A. D., 1920.

[SEAL.]

M. H. COULSTON,

*Acting Commissioner of Patents.*

Cl. 78—18.